Figure 1:
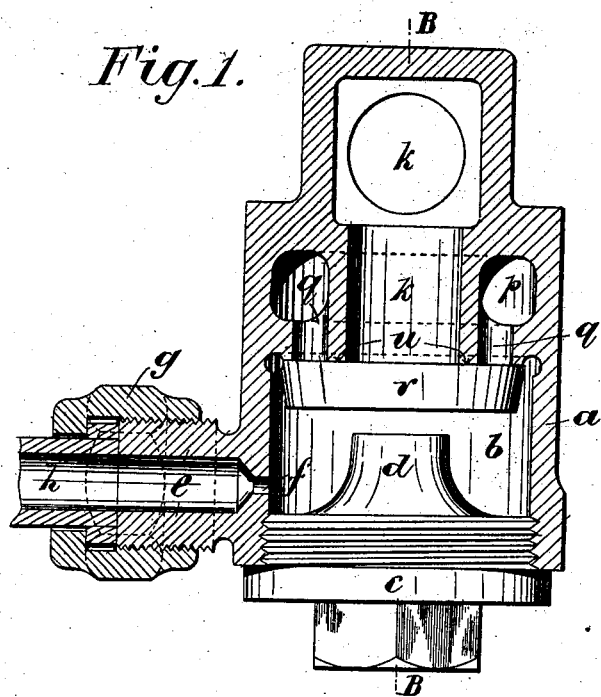

No. 720,499. PATENTED FEB. 10, 1903.
A. SPENCER.
RELIEF VALVE ARRANGEMENT FOR LOCOMOTIVE OR OTHER ENGINES.
APPLICATION FILED OCT. 6, 1902.
NO MODEL. 11 SHEETS—SHEET 1.

No. 720,499. PATENTED FEB. 10, 1903.
A. SPENCER.
RELIEF VALVE ARRANGEMENT FOR LOCOMOTIVE OR OTHER ENGINES.
APPLICATION FILED OCT. 6, 1902.
NO MODEL. 11 SHEETS—SHEET 2.
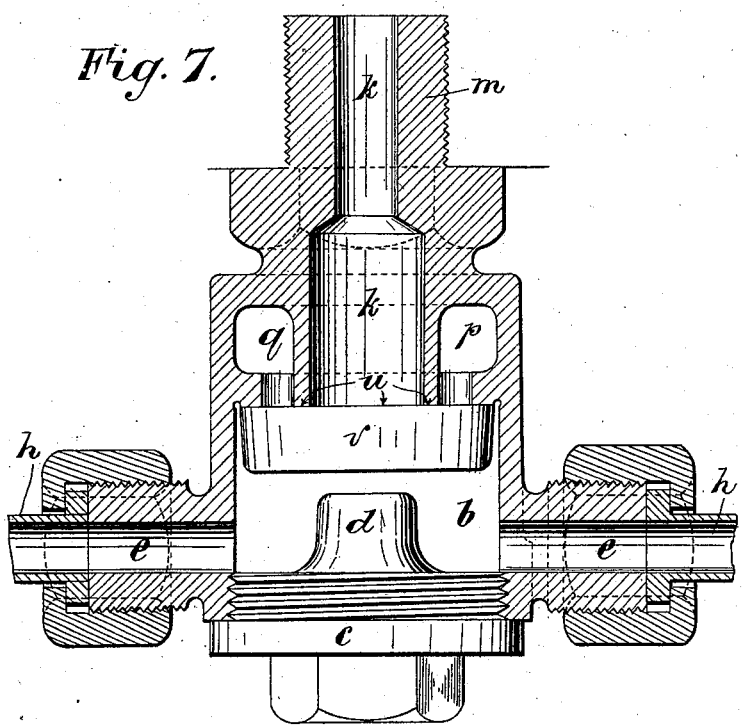
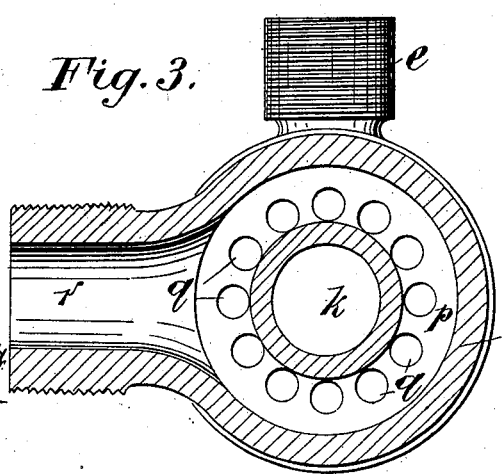

No. 720,499. PATENTED FEB. 10, 1903.
A. SPENCER.
RELIEF VALVE ARRANGEMENT FOR LOCOMOTIVE OR OTHER ENGINES.
APPLICATION FILED OCT. 6, 1902.
NO MODEL. 11 SHEETS—SHEET 4.

Witnesses
Chas. P. Wright
Alice W. Hoffman

Inventor
A. Spencer,
By A. S. Pattison
Atty.

No. 720,499. PATENTED FEB. 10, 1903.
A. SPENCER.
RELIEF VALVE ARRANGEMENT FOR LOCOMOTIVE OR OTHER ENGINES.
APPLICATION FILED OCT. 6, 1902.
NO MODEL. 11 SHEETS—SHEET 5.

Witnesses
Chas. P. Wright
Alice H. Hoffman

Inventor
A. Spencer,
By A. Pattison
Atty.

No. 720,499. PATENTED FEB. 10, 1903.
A. SPENCER.
RELIEF VALVE ARRANGEMENT FOR LOCOMOTIVE OR OTHER ENGINES.
APPLICATION FILED OCT. 6, 1902.
NO MODEL. 11 SHEETS—SHEET 6.

No. 720,499. PATENTED FEB. 10, 1903.
A. SPENCER.
RELIEF VALVE ARRANGEMENT FOR LOCOMOTIVE OR OTHER ENGINES.
APPLICATION FILED OCT. 6, 1902.
NO MODEL. 11 SHEETS—SHEET 7.

No. 720,499. PATENTED FEB. 10, 1903.
A. SPENCER.
RELIEF VALVE ARRANGEMENT FOR LOCOMOTIVE OR OTHER ENGINES.
APPLICATION FILED OCT. 6, 1902.
NO MODEL. 11 SHEETS—SHEET 9.

No. 720,499.  
PATENTED FEB. 10, 1903.

A. SPENCER.

RELIEF VALVE ARRANGEMENT FOR LOCOMOTIVE OR OTHER ENGINES.

APPLICATION FILED OCT. 6, 1902.

NO MODEL.  
11 SHEETS—SHEET 10.

No. 720,499. PATENTED FEB. 10, 1903.
A. SPENCER.
RELIEF VALVE ARRANGEMENT FOR LOCOMOTIVE OR OTHER ENGINES.
APPLICATION FILED OCT. 6, 1902.
NO MODEL. 11 SHEETS—SHEET 11.
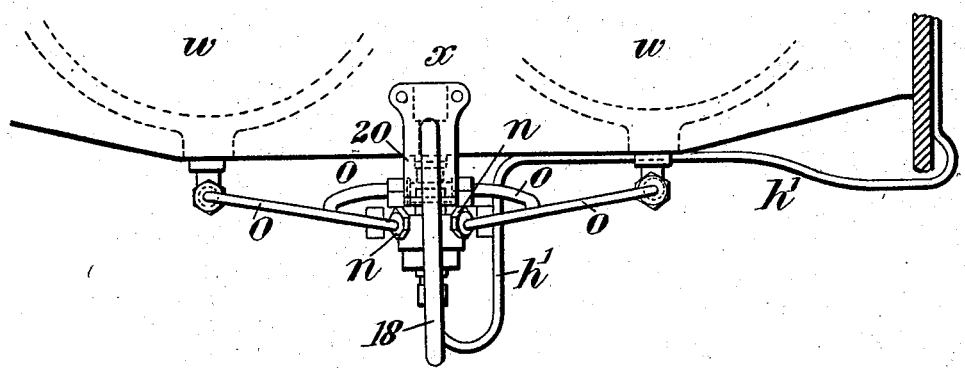
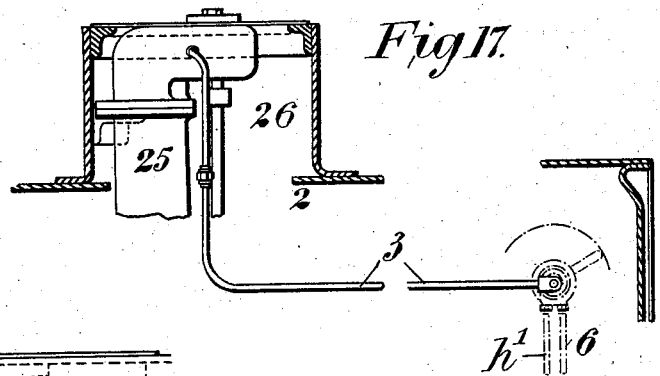
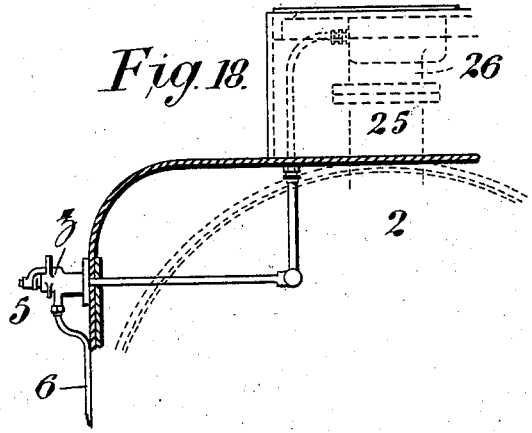

UNITED STATES PATENT OFFICE.

ALEXANDER SPENCER, OF LONDON, ENGLAND.

RELIEF-VALVE ARRANGEMENT FOR LOCOMOTIVE OR OTHER ENGINES.

SPECIFICATION forming part of Letters Patent No. 720,499, dated February 10, 1903.

Application filed October 6, 1902. Serial No. 126,248. (No model.)

*To all whom it may concern:*

Be it known that I, ALEXANDER SPENCER, a subject of the King of Great Britain and Ireland, residing at London, England, have invented Improvements in Relief-Valve Arrangements for Locomotive or other Engines, of which the following is a specification.

This invention has reference to improvements in relief-valve arrangements for locomotive and other engines for enabling water of condensation to escape from either end of the engine cylinder or cylinders and, it may be, from the steam chest or chests of such engine when the same are fitted with piston or like steam-distributing valves, the object being to provide a valve arrangement for the purpose mentioned that will not be readily liable to become inoperative or unreliable in consequence of the presence therein of greasy matter.

The invention consists for this purpose in a relief-valve arrangement comprising a casing formed with a valve-chamber and provided with a steam-inlet passage adapted to be directly or indirectly connected to the steam-boiler from which steam is supplied to the engine with which the valve arrangement is used, with one or more water-relief passages adapted to be connected through a suitable pipe or pipes to one or both ends of the engine cylinder or cylinders and, it may be, to the steam chest or chests of the engine, and a water-outlet passage terminating at its outer end in the external atmosphere, the inner ends of the said passages terminating in the valve-chamber and the inner ends of the water relief and outlet passages terminating in a common plane and being controlled by a single loose relief-valve that is arranged in the said valve-chamber and is common to the water relief and outlet passages which it is adapted to simultaneously close, so that it is of an area greater than the cross-sectional area of the water-relief passage or passages.

The invention also consists in various novel features of construction and in combinations and arrangements of parts, all as hereinafter more particularly described, and pointed out in the claims.

Figure 2:
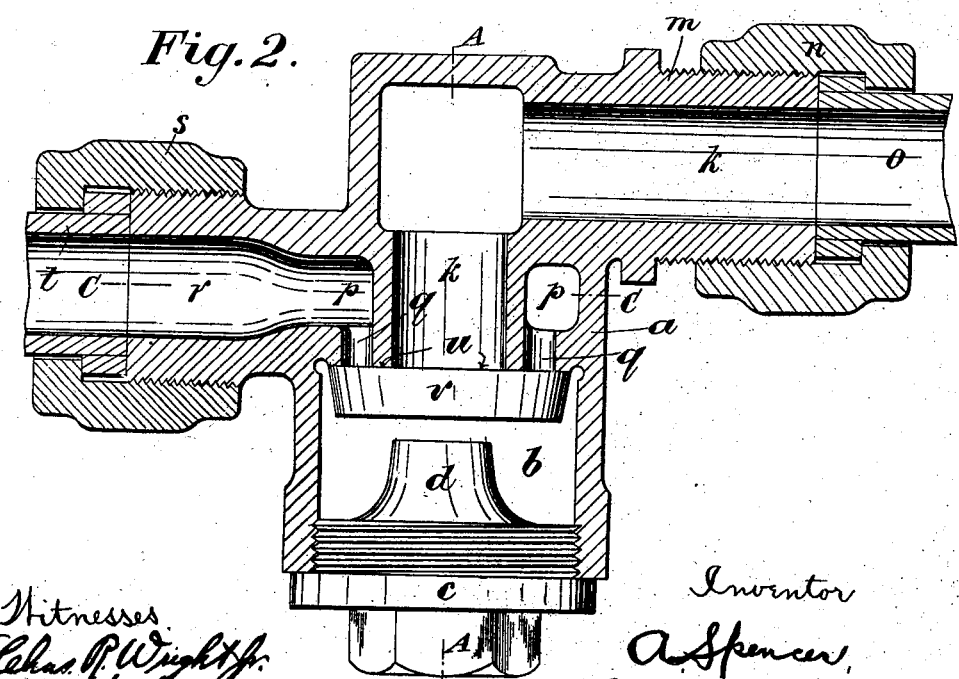
Figure 4:
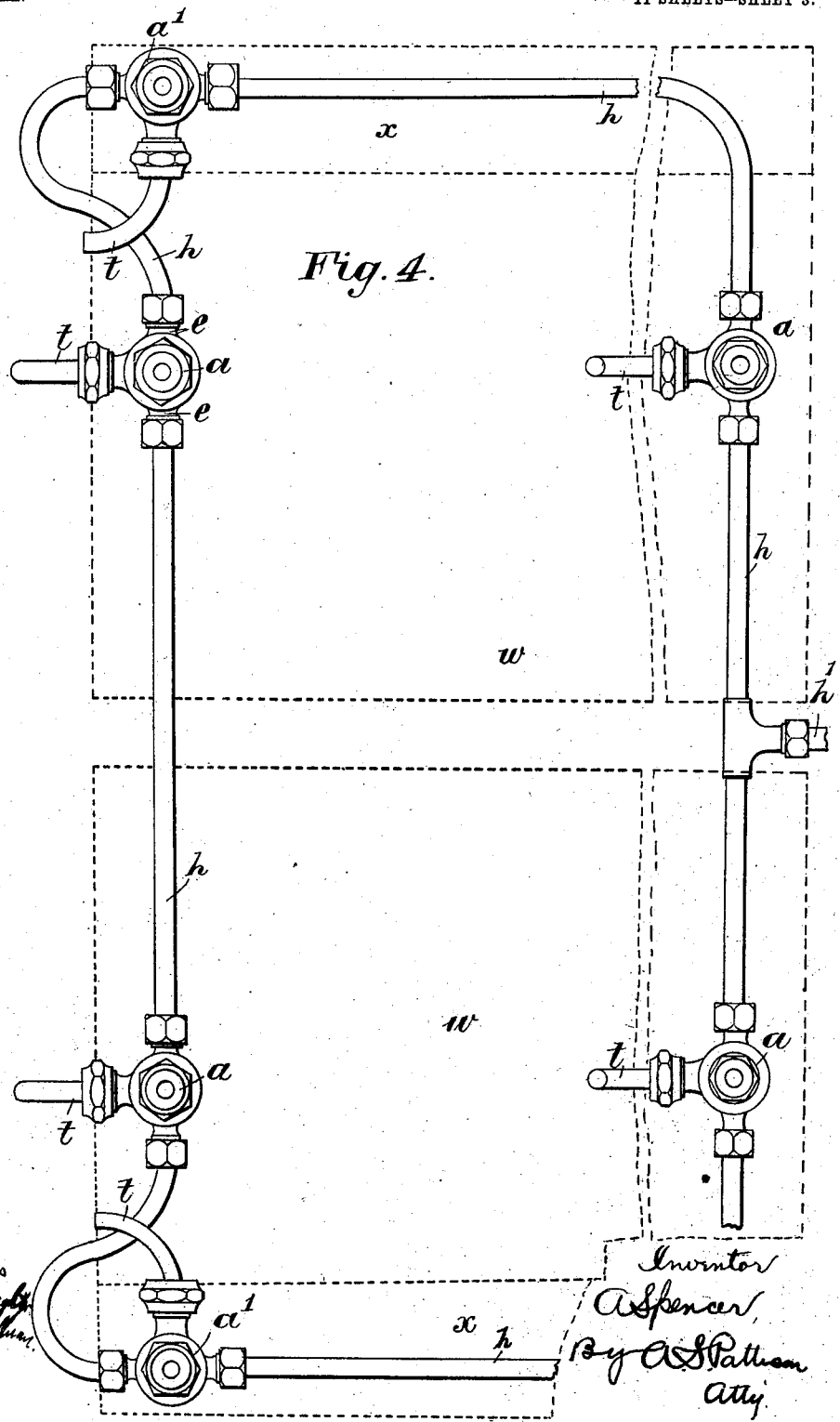
Figure 5:
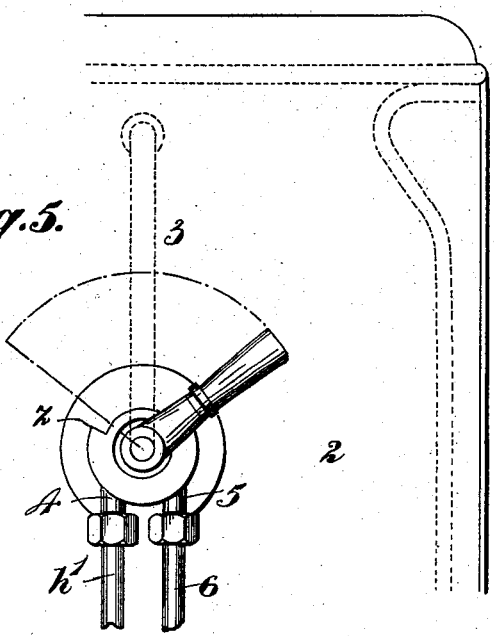
Figure 6:
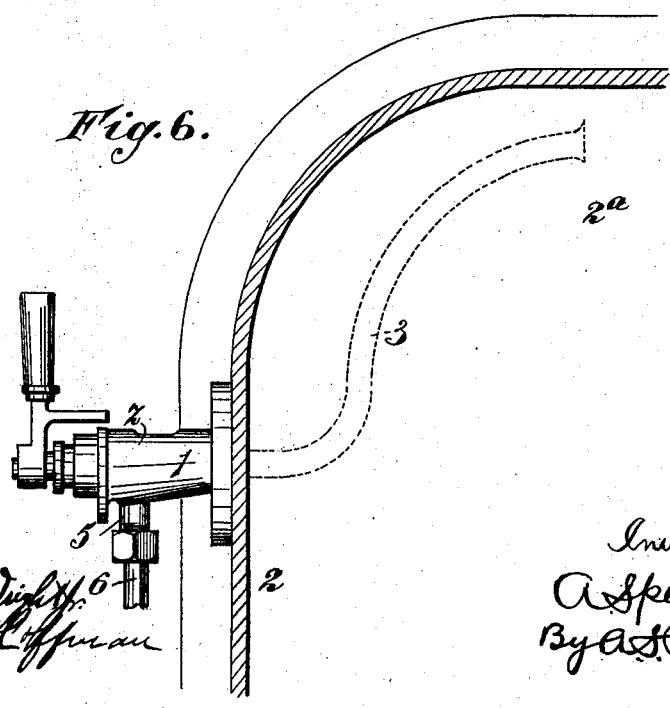
Figure 8:
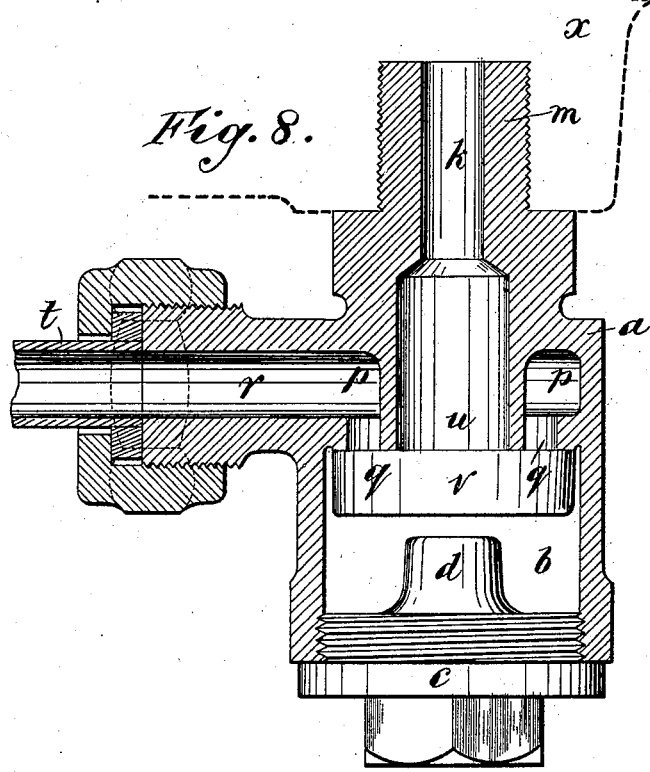
Figure 9:
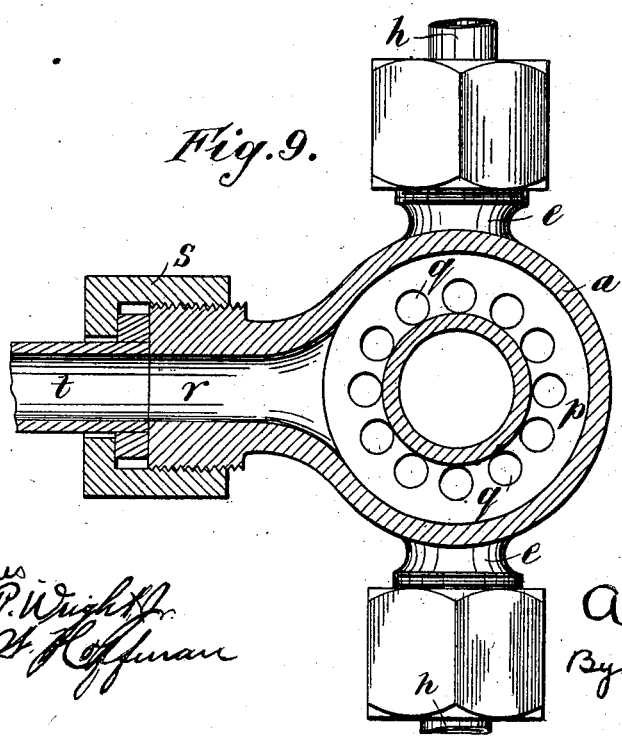
Figure 10:
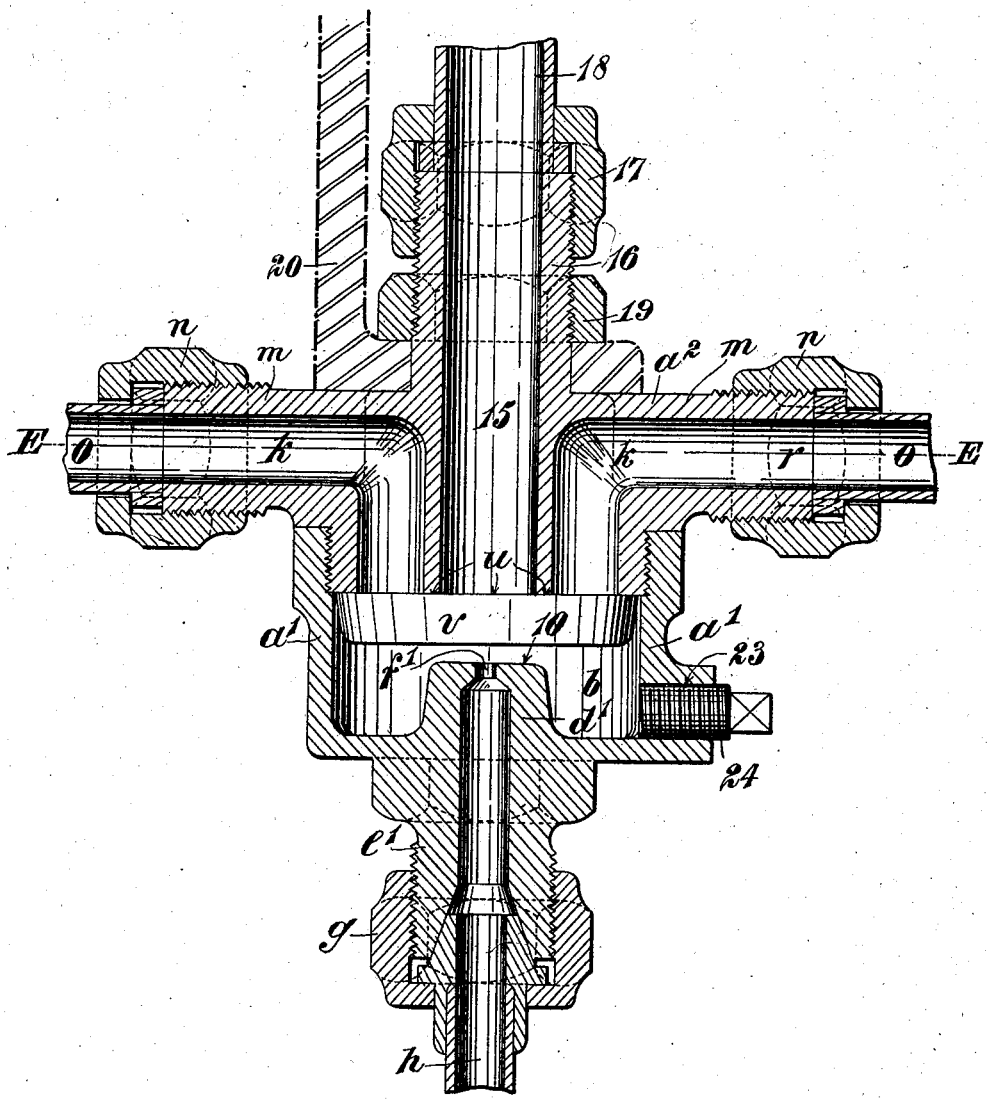
Figure 11:
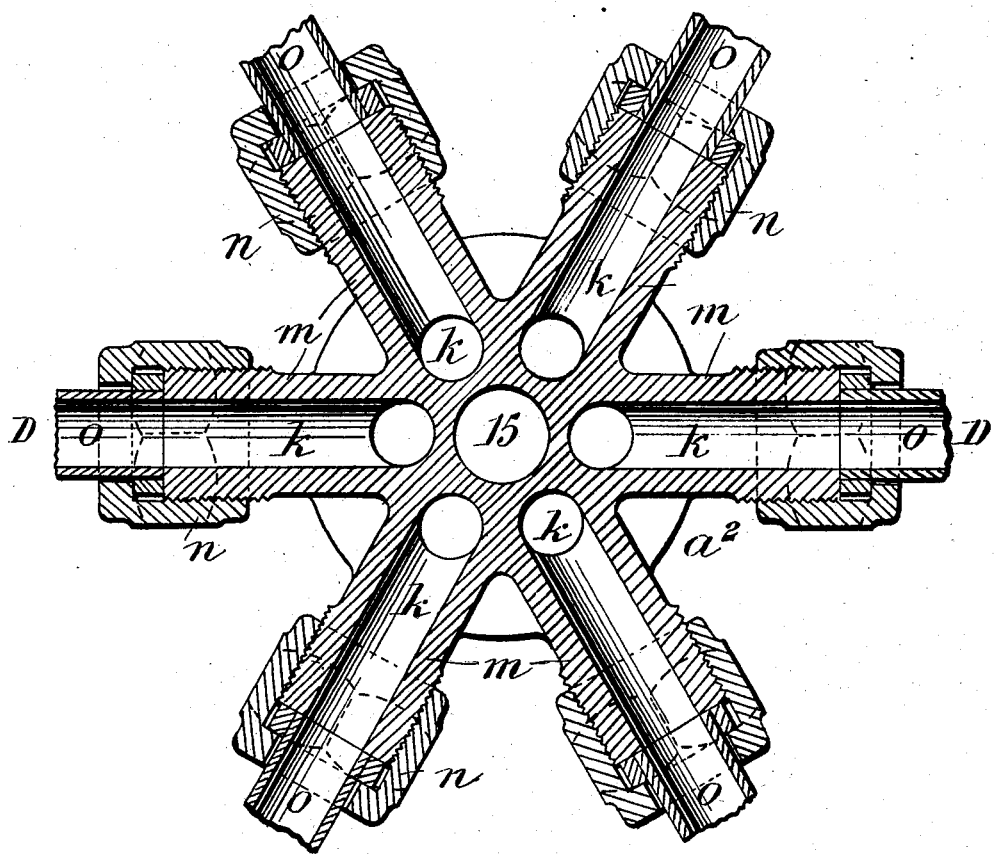
Figure 12:
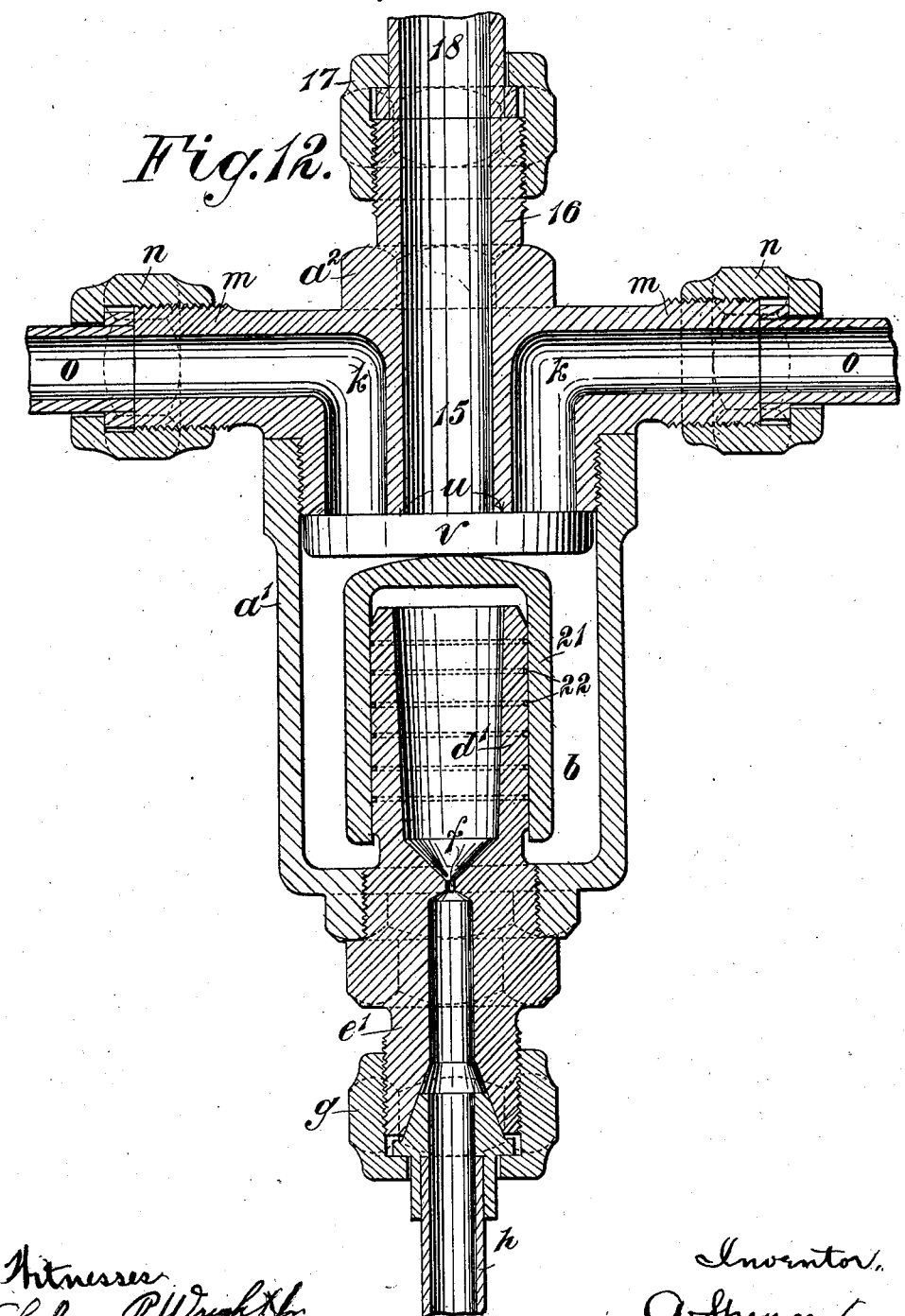
Figure 13:
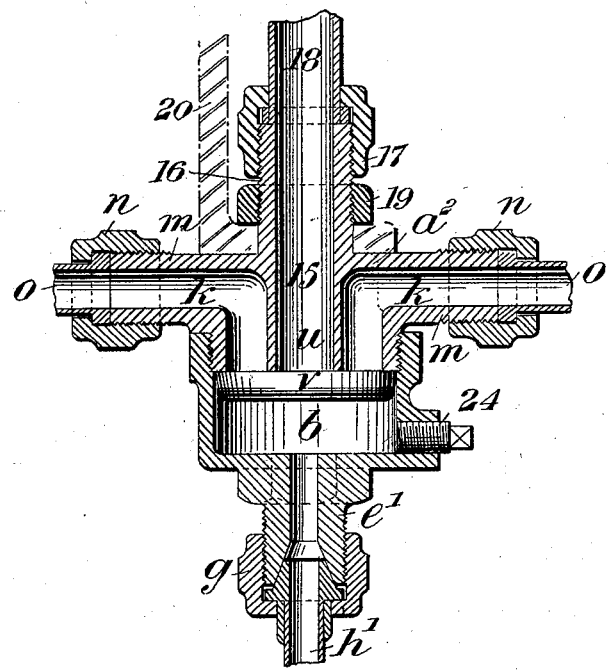
Figure 14:
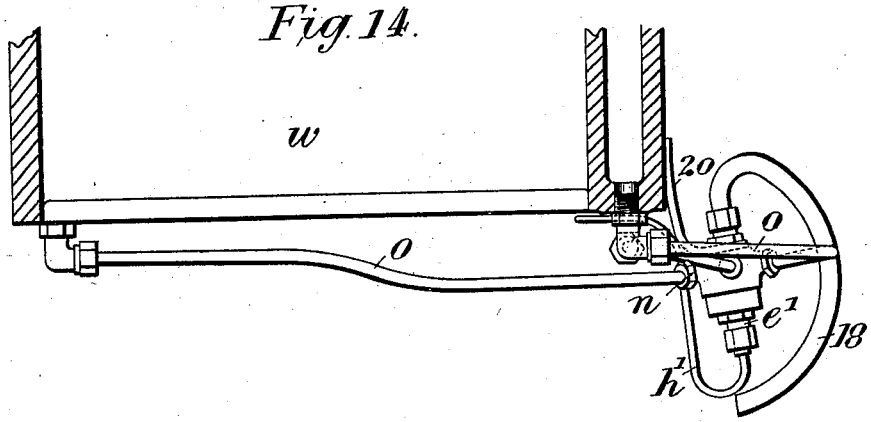
Figure 16:
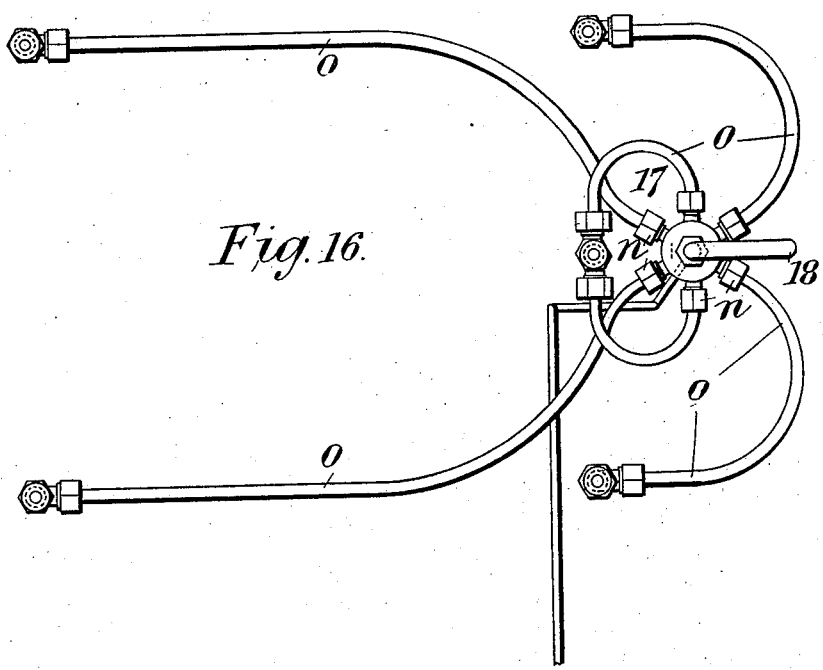

In the accompanying illustrative drawings, Figure 1 is a section on the line A A of Fig. 2, Fig. 2 is a section on the line B B of Fig. 1, and Fig. 3 is a section on the line C C of Fig. 2, showing one construction of relief-valve arrangement according to this invention and suitable for use with one or each end of an engine-cylinder or with a steam chest or chests fitted with a piston distributing valve or valves. Fig. 4 is a plan view showing a set of six relief-valves connected together through a common steam-supply pipe, four of the valves serving for the respective ends of the two cylinders of a locomotive-engine and the remaining two valves serving for the respective steam-chests of such cylinders. Figs. 5 and 6 are respectively a front elevation and a side elevation of part of a locomotive-boiler with a three-way valve for connecting the common steam-supply pipe of the several valves shown in Fig. 4 to a steam-pipe in the boiler and to a steam-relief pipe. Figs. 7, 8, and 9 are similar views to Figs. 1, 2, and 3, respectively showing a modified construction of relief-valve adapted to be coupled to a common steam-pipe, as in Fig. 4, Fig. 8 also showing in dotted lines a part of an engine-cylinder to which such relief-valve is attached. Fig. 10 is a vertical section on the line D D of Fig. 11, and Fig. 11 is a horizontal section on the line E E of Fig. 10, showing another modified construction of relief-valve with means (shown in dotted lines) for supporting the same in position for use. Fig. 12 is a vertical section showing a further-modified construction of relief-valve provided with means for preventing escape of steam from the steam-supply pipe when the relief-valve proper is open. Fig. 13 is a similar view to Fig. 10, showing another modified construction. Figs. 14 and 15 are respectively side and end elevations, each partly in section; and Fig. 16 is a plan showing how a valve of the kind shown in Figs. 10 and 11 can be connected to the two cylinders and steam-chest of a locomotive-engine. Figs. 17 and 18 are respectively front and side elevations, on a relatively small scale, of part of a locomotive-boiler with a three-way valve for controlling the supply of steam and also the steam-relief pipe.

Referring to Figs. 1, 2, and 3, the relief-valve casing $a$, which may conveniently be a casting, is formed at one portion — say its lower end portion, as shown — with a cylindrical valve-chamber $b$, that is closed at the outer end by a screw-plug $c$, having an inward extension $d$, and is provided with a lateral steam-inlet branch $e$, that communicates with the said valve-chamber through a contracted opening $f$ and is adapted to be connected, as by a screw-union $g$, to a steam-pipe $h$, leading to a boiler or to the steam-chest of a steam-engine. The opposite portion of the casing $a$—say the upper portion—is provided with a water-relief passage $k$, the outer end portion of which is horizontal and extends through a lateral branch $m$, adapted to be connected, as by a screw-union $n'$, to a water-relief pipe $o$, connected to one or to each end of an engine-cylinder or to a steam chest or chests to be relieved of water of condensation, the inner end portion of the said passage $k$ being arranged centrally of the casing $a$ and valve-chamber $b$ and terminating in the latter. Extending around the inner central portion of the water-relief passage $k$ is an annular water-outlet passage $p$, that communicates with the valve-chamber $b$ through a circular row of ports or passages $q$ and also with a laterally-extending water-outlet passage $r$, that is adapted to be connected, as by a screw-union $s$, to a drain-pipe $t$. The inner end of the water-relief passage $k$ and the inner ends of the ports or passages $q$ around the same terminate in a flat circular valve-face $u$ and are controlled by a flat disk-like relief-valve $v$, that is of smaller diameter than the interior of the valve-chamber $b$, in which it is placed, so that it will not be liable to become held fast therein by oily matter that may gain access thereto.

The several water-relief valves for the cylinders $w$, or cylinders $w$ and valve-chests $x$, of a locomotive or other engine may, as shown in Fig. 4, conveniently have their steam-inlet branches $e$ connected to a common steam-supply pipe $h'$, that is connected to the boiler through a hand-operated three-way cock $z$, Figs. 5 and 6, one branch, 1, of which is connected to the steam-space $2^a$ of the boiler 2 through a pipe 3, another branch, 4, of which is connected to the steam-pipe $h'$, common to the valve-chambers $b$ of the several relief-valve arrangements, Fig. 4, and the third branch, 5, of which is connected to a steam-relief or waste pipe 6. By this arrangement the pressure in the valve-chambers $b$ can be controlled, and hence the steam-pressure on the valve $z$ correspondingly controlled, so that water of condensation in the engine-cylinders and valve-chests can escape at a pressure considerably below the boiler-pressure when this may be desired. For an arrangement of this kind it is convenient to construct each water-relief valve, as shown in Figs. 7, 8, and 9, with two oppositely-arranged steam-inlet branches $e$ $e$ to its valve-chamber $b$, so that the several valve-chambers can be connected up in series to intermediate pipes to form a continuous steam passage or pipe $h'$, that is connected at one point to the boiler through a three-way valve $z$, such as described. The upper portion of the relief-passage $k$ may in this case conveniently be arranged vertically and in line with the lower portion, as shown, so that the branch $m$ can be screwed direct to the bottom of an engine-cylinder $w$, Fig. 8, or steam-chest.

In the modified construction of water-relief valve shown in Figs. 10 and 11 the valve-casing is made in two main parts—viz., a hollow cylindrical part $a'$, that forms the valve-chamber $b$, and a hub-like part $a^2$, in which the water relief and outlet passages are formed—these two parts being secured together, as by screwing, as shown. The cylindrical part $a'$, which may conveniently be a casting, is formed on its outer side with a centrally-arranged tubular extension $e'$, that is adapted to be connected by a screw-union $g$ to a steam-pipe $h$ for connection to a boiler and on its inner side is formed with a central tubular extension $d'$, that projects into the valve-chamber $b$ and terminates in a flat circular face 10, the steam-passage through the two extensions $e'$ and $d'$ and intermediate end wall of the chamber being preferably contracted at one part—for example, at its inner end, as shown at $f'$. The second or hub-like part $a^2$ of the casing, which may also conveniently be formed as a casting, is provided with a suitable number—say six—of radially-arranged tubular extensions or branches $m$, that are adapted at their outer ends to be connected by screw-unions $n$ to water-relief pipes $o$, connected to the ends of engine-cylinders, or to the ends of cylindrical steam-chests, or some to cylinder ends and some to steam-chests. The inner end portions of the passages $k$ through the said radial extensions or branches $m$, forming the water-relief passages, are bent at right angles to the outer portions and are arranged in a circular row around a central outlet-passage 15, that extends through an external centrally-arranged tubular extension 16 of the hub-like part $a^2$, which is adapted to be connected, as by a screw-union 17, to a water-outlet pipe or spout 18. The said tubular extension 16 also serves as a convenient means, in conjunction with a nut 19 and an angle-iron or other support 20, for attaching the apparatus to the cylinder casting or framing of an engine. The inner ends of the water relief and outlet passages $k$ and 15 respectively terminate in a circular valve-face $u$ and are controlled by a flat disk-like relief-valve $v$, that is of smaller diameter than the interior of the valve-chamber $b$, for the purpose hereinbefore mentioned.

To prevent the escape of steam from the boiler through the valve arrangement when the water-relief valve $v$ is forced from its seat $u$ by escaping water of condensation under the action of either of the engine-pistons or piston-valves, the tubular extension 9 within the valve-chamber $b$ may be closed by a device that will under the action of the steam-pressure move in a direction to close the relief-valve $v$ and under the action of the water-pressure will move in the opposite direction to allow such valve to open and will at the same time prevent or practically prevent escape of steam from the inlet-pipe $h$. In the arrangement shown for this purpose in Fig. 12 the said inner tubular extension $d'$ is made in the form of a hollow cylinder over which is fitted a movable hollow plunger or cap 21, the closed end of which bears against the relief-valve $v$, a more or less fluid-tight joint being maintained between the two parts by suitable packing means that will permit of the plunger or cap moving freely. For this purpose one of the two engaging parts $d'$ and 21 may be formed with a number of annular grooves 22, that are spaced apart and serve to prevent or retard passage of steam between the two said parts. In the example the grooves 22 are formed in the extension $d'$.

The steam-inlet pipe $h$ for the valve-chamber $b$ of the arrangements shown in Figs. 10, 11, and 12 may be connected to the boiler through a three-way cock, such as hereinbefore described with reference to Figs. 5 and 6. In each case the relief-valve will usually be so arranged in use that the valve-chamber $b$ will be at the bottom, in which case the said valve-chamber may be provided with a drain-hole 23, Fig. 10, that is normally closed by a removable stopper 24.

In some cases the extension $d'$ with contracted opening $f'$ may be omitted, as in the example shown in Fig. 13.

Figs. 14 and 15 are respectively side and end elevations, each partly in section; and Fig. 16 is a plan showing an arrangement of pipes employed when a relief-valve furnished with a number of radial extensions or branches—such as described with reference to Figs. 10 to 13, inclusive—is connected to the cylinders $w$ and steam-chest $x$ of a locomotive-engine.

Figs. 17 and 18 are views similar to Figs. 5 and 6, respectively, but to a smaller scale, showing the branch 1 of the three-way cock $z$ connected, through a pipe 3, to the main steam-supply pipe 25 at a part thereof within the steam-dome 26 of the boiler 2.

The operation in each case is as follows: When the steam-inlet passage through the inlet branch $e$ or $e'$ is connected to the boiler 2, Figs. 5 and 6, or other source of steam-pressure and the water-relief passage or passages $k$ is or are connected to one or each end of the engine-cylinder $w$ or of each cylinder and, it may be, to the steam chest or chests $x$ of the engine, then upon opening communication between the steam-inlet passage and boiler the relief-valve $v$ will be forced against its seat $u$ and simultaneously close the inner ends of the water relief and outlet passages $k$, $q$, and $p$, Figs. 1 to 3 and 7 to 9, or $k$ and 15, Figs. 10, 11, 12, and 13, terminating within the valve-chamber $b$; but in the event of water of condensation accumulating within the engine cylinder or cylinders or steam chest or chests such water will under the pressure of the engine piston or pistons or piston distributing valve or valves, as the case may be, force the water-relief valve $v$ from off its seat in such a manner as to allow of its escaping through the corresponding water-relief pipe and passage $o$ and $k$ and the outlet-passages $q$ $p$ and pipe $t$, Figs. 1 to 3 and 7 to 9, or outlet-passage 15 and pipe 18, Figs. 10 to 13, after which the relief-valve $v$ will be again automatically closed, the said valve being loose, and therefore unrestrained in its opening and closing movements by the sides of the valve-chamber $b$. By means of the three-way valve $z$ the communication between the boiler and chambers $b$ can be cut off and the chambers thrown into communication with the external atmosphere through the relief-pipe 6, which will relieve the valves $v$ of all pressure and permit them to open freely and allow the water of condensation within the relief pipe or pipes $o$ and passages $k$ to flow away through the outlet-passage.

What I claim is—

1. A water-relief valve for a locomotive or other engine, comprising a casing having a valve-chamber provided with a steam-inlet passage adapted to be connected to the steam-supply of said engine, a water-relief passage adapted to be connected to the engine-cylinder or other part from which water of condensation is to be forced, and a water-outlet passage, and a relief-valve loosely arranged within said valve-chamber and adapted to simultaneously close the communication between the inner and adjacent ends of said relief and outlet passages.

2. A water-relief valve for a locomotive or other engine, comprising a casing having a valve-chamber provided with a steam-inlet passage adapted to be connected to the steam-supply of said engine, a water-relief passage adapted to be connected to the engine-cylinder or other part from which water of condensation is to be forced, and a water-outlet passage, the inner ends of the water relief and outlet passages terminating in a common plane in said valve-chamber, and a relief-valve that is loosely arranged within said valve-chamber and is adapted to simultaneously close said water relief and outlet passages.

3. A water-relief valve for a locomotive or other engine, comprising a casing having a valve-chamber provided with a steam-inlet passage adapted to be connected to the steam-supply of said engine, a water-relief passage adapted to be connected to the engine-cylinder or other part from which water of condensation is to be forced, and a water-outlet passage, the inner ends of the water relief and outlet passages being arranged around one another and terminating in a common plane in said valve-chamber, and a relief-valve loosely arranged within said valve-chamber and having a flat face adapted to simultaneously close the inner ends of said relief and outlet passages.

4. A water-relief valve for a locomotive or other engine, comprising a casing having a valve-chamber provided with a steam-inlet passage adapted to be connected to the steam-supply of said engine, a water-relief passage adapted to be connected to an engine-cylinder or other part from which water of condensation is to be forced, and a water-outlet passage leading to the external atmosphere, the inner end portions of said water relief and outlet passages terminating in a common plane, a relief-valve loosely arranged within said valve-chamber and having a flat face adapted to simultaneously close the inner ends of said relief and outlet passages, and a stop located within said valve-chamber and adapted to limit the extent of opening of said valve.

5. A water-relief valve for a locomotive or other engine, comprising a casing having a valve-chamber provided with a steam-inlet passage adapted to be connected to the steam-supply of said engine, a number of water-relief passages adapted to be separately connected to parts of the engine from which water of condensation is to be forced, and a water-outlet passage, said water relief and outlet passages having their inner ends terminating within said valve-chamber, and a relief-valve loosely arranged in said valve-chamber and adapted normally to close the inner ends of said water relief and outlet passages.

6. A water-relief valve for a locomotive or other engine, comprising a casing having a valve-chamber provided with a steam-inlet passage adapted to be connected to the steam-supply of said engine, a number of water-relief passages adapted to be separately connected to parts of the engine from which water of condensation is to be forced, the inner end portions of said relief-passages terminating within valve-chamber and arranged around a common center, a water-outlet passage having its inner end portion arranged between the inner end portions of said relief-passages and also terminating within said valve-chamber, and a valve loosely arranged within said valve-chamber and adapted to simultaneously control the inner ends of said water relief and outlet passages.

7. A water-relief valve for a locomotive or other engine, comprising a casing having a valve-chamber the outer end of which is provided with an external centrally-arranged steam-inlet branch, adapted to be connected to the steam-supply of said engine, a number of radially-arranged water-relief passages adapted to be separately connected to parts of the engine from which water of condensation is to be forced, and a centrally-arranged water-outlet passage, the inner end portions of said water-relief passages being arranged around the inner end of said outlet-passage and the inner ends of all of said relief and outlet passages terminating in a common flat valve-face at the inner end of said valve-chamber, and a flat valve loosely arranged in said valve-chamber and adapted to bear on said valve-face and simultaneously close the ends of the said passages therein.

8. A water-relief valve for a locomotive or other engine, comprising a casing having a valve-chamber the outer end of which is provided with centrally-arranged inner and outer extensions having a steam-passage therethrough, the outer extension being adapted to be connected to the steam-supply of said engine, a number of radially-arranged water-relief passages having their outer ends adapted to be separately connected to parts of the engine from which water of condensation is to be forced and having their inner end portions bent and arranged in a circle coaxial to the casing, and a centrally-arranged water-outlet passage having its outer end adapted to be connected to a drain-pipe, the inner ends of said water relief and outlet passages terminating in a common flat valve-face at the inner end of said valve-chamber, and a flat valve arranged loosely within said valve-chamber between said inner extension and valve-face and adapted to normally bear against the latter and close the passages therein, substantially as described.

9. A water-relief valve for a locomotive or other engine, comprising a casing made in two main parts adapted to be connected together, one of said parts being formed with a valve-chamber the outer end of which is provided with centrally-arranged inner and outer extensions having therethrough a steam-passage adapted to be connected to a steam-supply, and the other of said parts being formed with a centrally-arranged water-outlet passage and a number of radially-arranged water-relief passages the outer ends of which are provided with pipe-unions and the inner end portions of which, as well as the inner end of said outlet-passage, terminate in a common valve-face forming the inner end of said valve-chamber when the two parts of the casing are connected together, and a flat valve loosely arranged within said valve-chamber and adapted to close the inner ends of said water relief and outlet passages, substantially as described.

10. A water-relief valve for a locomotive or other engine, comprising a valve-casing having a valve-chamber the outer end of which is provided with inner and outer tubular extensions, and water relief and outlet passages having their inner ends terminating in a common plane at the inner end of said valve-chamber, the outer ends of said extension, water-relief passage, and water-outlet passage being adapted to be connected respectively to a steam-pipe, a water-relief pipe and a drain-pipe, a valve loosely arranged within said valve-chamber and adapted to simultaneously close the ends of the passages in said valve-face, and an endwise-movable device arranged to fit said inner tubular extension and form a more or less fluid-tight joint therewith and to bear against said valve, substantially as described.

11. A water-relief valve for a locomotive or other engine, comprising a valve-casing having a valve-chamber the outer end of which is provided with inner and outer tubular extensions, and water relief and outlet passages having their inner ends terminating in a common plane at the inner end of said valve-chamber, the outer ends of said extension, water-relief passage, and water-outlet passage being adapted to be connected respectively to a steam-pipe, a water-relief pipe and a drain-pipe, a valve loosely arranged within said valve-chamber and adapted to simultaneously close the ends of the passages in said valve-face, and a hollow cap or cover adapted to slide endwise on said inner tubular extension and form a more or less fluid-tight joint therewith and to bear against said valve, substantially as described for the purpose specified.

12. A water-relief valve for a locomotive or other engine, comprising a valve-casing having a valve-chamber the outer end of which is provided with inner and outer tubular extensions, and water relief and outlet passages having their inner ends terminating in a common plane at the inner end of said valve-chamber, the outer ends of said extension, water-relief passage, and water-outlet passage being adapted to be connected respectively to a steam-pipe, a water-relief pipe and a drain-pipe, a valve loosely arranged within said valve-chamber and adapted to simultaneously close the ends of the passages in said valve-face, and an endwise-movable closing device arranged to bear against said valve and adapted to fit and slide endwise on said inner tubular extension, one of these two engaging parts being formed with a number of annular grooves arranged adjacent to the other part, substantially as described for the purpose specified.

13. A water-relief valve for a locomotive or other engine, comprising a casing having a valve-chamber provided with a steam-inlet passage adapted to be connected to the steam-supply of said engine, a water-relief passage connected with the engine-cylinder or other part from which water of condensation is to be forced, and a water-outlet passage, and a relief-valve loosely arranged within said valve-chamber and adapted to directly engage and close the adjacent ends of said passages.

Signed at 77 Cannon street, London, England, this 22d day of September, 1902.

ALEXANDER SPENCER.

Witnesses:
R. T. GLASCODINE,
PERCY E. MATTOCKS.